United States Patent
Serravalle et al.

(10) Patent No.: US 8,849,282 B2
(45) Date of Patent: Sep. 30, 2014

(54) APPARATUS AND METHOD FOR HANDOFF AND LOAD BALANCING USING CELL CAPABILITY STORED IN NEIGHBOR ROUTING TABLE

(75) Inventors: Francesca Serravalle, Tokyo (JP); Milena Filipovic, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/390,492

(22) PCT Filed: Aug. 10, 2010

(86) PCT No.: PCT/JP2010/063792
§ 371 (c)(1),
(2), (4) Date: Feb. 14, 2012

(87) PCT Pub. No.: WO2011/021593
PCT Pub. Date: Feb. 24, 2011

(65) Prior Publication Data
US 2012/0142356 A1 Jun. 7, 2012

(30) Foreign Application Priority Data
Aug. 17, 2009 (GB) .................................. 0914380.1

(51) Int. Cl.
*H04W 36/00* (2009.01)
(52) U.S. Cl.
CPC ................................ *H04W 36/0016* (2013.01)
USPC .......................................................... 455/436
(58) Field of Classification Search
CPC ............ H04W 36/0083; H04W 24/02; H04W 84/045; H04W 36/0061; H04W 36/0055; H04W 48/16; H04W 48/08; H04W 36/0066; H04W 11/0093; H04W 24/10; H04W 48/10; H04W 36/08; H04W 48/18; H04W 84/18; H04W 36/00; H04W 36/0016; H04W 36/0072; H04W 36/04
USPC ........... 455/432.1, 432.3, 434, 436, 443, 444, 455/448, 449, 450, 452.2, 453, 435.1, 455/435.2, 437, 438; 370/252, 253, 254, 370/255, 328, 331, 332, 333, 334
See application file for complete search history.

(56) References Cited

U.S. PATENT DOCUMENTS

2006/0140117 A1* 6/2006 Aerrabotu et al. ............. 370/232
2008/0026752 A1* 1/2008 Flore et al. ................... 455/435.2
(Continued)

FOREIGN PATENT DOCUMENTS

CN 101232730 (A) 7/2008
CN 101267642 (A) 9/2008
(Continued)

OTHER PUBLICATIONS

Agilent, HSUPA Concepts, Jan. 15, 2009, Agilent, p. 1.*
(Continued)

*Primary Examiner* — Asghar Bilgrami
*Assistant Examiner* — Hung Du
(74) *Attorney, Agent, or Firm* — McGinn I.P. Law Group, PLLC

(57) ABSTRACT

A user communications device, such as a mobile telephone, obtains and reports capability information to a serving base station. The capability information identifies if a neighboring UTRAN base station is HSPA/EDCH capable. The serving E-UTRAN base station can use this information to control handover decisions and load balancing performed thereby.

20 Claims, 6 Drawing Sheets

(56) References Cited

U.S. PATENT DOCUMENTS

| | | | |
|---|---|---|---|
| 2008/0064397 A1 | 3/2008 | Park et al. | |
| 2008/0130578 A1* | 6/2008 | Wang et al. | 370/331 |
| 2008/0287129 A1* | 11/2008 | Somasundaram et al. | 455/436 |
| 2009/0191862 A1 | 7/2009 | Amirijoo et al. | |
| 2010/0165918 A1 | 7/2010 | Kobayashi | |
| 2010/0202307 A1* | 8/2010 | Lee et al. | 370/252 |
| 2010/0329150 A1* | 12/2010 | Nielsen | 370/254 |
| 2012/0135771 A1 | 5/2012 | Futaki | |

FOREIGN PATENT DOCUMENTS

| | | |
|---|---|---|
| EP | 1 694 011 A1 | 8/2006 |
| EP | 2 059 061 A1 | 5/2009 |
| JP | 2002-512762 (A) | 4/2002 |
| JP | 2005-051568 (A) | 2/2005 |
| JP | 2005-229417 (A) | 8/2005 |
| KR | 20080032807 (A) | 4/2008 |
| WO | WO 98/58515 A1 | 12/1998 |
| WO | WO 2009/096835 (A1) | 8/2009 |
| WO | WO 2011/016560 (A1) | 2/2011 |

OTHER PUBLICATIONS

LTE; Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8), Technical Specification, European Telecommunications Standards Institute (ETSI), 650, Route Des Lucioles; F-06921 Sophia-Antipolis; France, No. V8.9.0, Jul. 1, 2009, XP014044751.

International Search Report in PCT/JP2010/063792 dated Dec. 9, 2010 (English Translation Thereof).

ETSI TS 136 300, V8.9.0. (Jul. 2009),Technical Specification, $3^{rd}$ Generation Partnership Project; LTE; Evolved Universal Terrestial Radio Access(E-UTRA) and Evolved Universal Terrestrial Radio Access Network (E-UTRAN); Overall description Stage 2 (3 GPP TS 36.00 Version 8.9.0 Release 8).

Vodafone Group:"Introduction of the HSDPA and E-DCH Capable Cell Indicator" 3GPP Draft; R2-052753-HSDPA+E-DCH Cell Indicator CR, $3^{rd}$ Generation Partnership Project (3GPP), Mobile Competence Centre; 650, Route des Lucioles; F-06921 Sophia-Antipolis Cedex; France; vol. RAN WG2, No. Seoul, Korea; 20051 29751, Nov. 3, 2005, EP050129751, [retrieved on Nov. 3, 2005].

Ulrich Barth: "Self-X RAN Autonomous Self Organizing Radio Access Networks", [Online] Jun. 23, 2009, 2009 $7^{th}$ International Symposium on modeling and Optimizing in Mobile, AD HOC, and Wireless Networks: (WIOPT 2009); Seoul, Korea, Jun. 23-27, 2009, IEEE, Piscataway NJ, USA, pp. 1-36, XP002603562, ISBN: 978-1-4244-4919-4, Retrieved from Internet URL; http://www.wiopt.org/pdf/Wi0pt09__Keynote__Speech3.pdf>.

Alcatel-Lucent, et al: "UE Knowledge of Network Capabilities for HSPA SRVCC" 3GPP Draft; S2-091592_WAS1153_Voimscapabilities, $3^{rd}$ Generation Partnership Project (3GPP), Mobile Competence Centre; 650, Route des Lucioles; F-06921 Sophia-Antipolis Codex; France; No. Budapest; Feb. 18, 2009, XP050333872 [retrieved onFeb. 18, 2009].

"Inter-RAT/frequency Automatic Neighbour Relation Function" [Online] Nov. 5, 2007 XP0079049777 Retrieved from Internet URL Http://www.3ggp1.org/ftp/tsg_ran/WG3_lu/TSGR3_58/docs/>.

Japanese Office Action dated Feb. 5, 2014, (with English Translation).

CATT,CMCC, "New attribute for Neighbor Relation Table", R3-081068, GPP TSG RAN WG3 Meeting # 60, Kansas City, USA, May 5-9, 2008, 10.1.1a.

\* cited by examiner

US 8,849,282 B2

APPARATUS AND METHOD FOR HANDOFF AND LOAD BALANCING USING CELL CAPABILITY STORED IN NEIGHBOR ROUTING TABLE

TECHNICAL FIELD

The present invention relates to mobile telecommunications networks, particularly but not exclusively networks operating according to the 3GPP standards or equivalents or derivatives thereof.

BACKGROUND ART

Mobile telecommunications networks enable users of User Equipment (UE) to communicate with other such users via one of a number of base stations and a core network. Each base station defines a number of cells of the network. In an active state a UE is registered with the network and has an RRC (Radio Resource Control) connection with a base station so that the network knows which cell the UE belongs to and can transmit data to and receive data from the UE. In the Long Term Evolution (LTE) of UTRAN (UMTS Terrestrial Radio Access Network) referred to as E-UTRAN, in the Active state, the handover procedure allows UEs to have service continuity while moving between LTE cells and when moving to cells of other RATs (Radio Access Technologies), such as UTRAN cells and GERAN cells.

E-UTRAN base stations (referred to as eNBs) are able to handover a UE to another E-UTRAN cell (Inter frequency handover) or to a cell of another RAT (Inter RAT handover) only if the source cell is aware of the existence of the target cell. This information may be configured into the base station. However, due to the cost of doing this and due to the continuous updating of this configuration information, an automatic procedure has been defined in the 3GPP standards documentations (see TS 36.300 V9.0.0). This automatic procedure is referred to as ANR (Automatic Neighbour Relation) and relies on the UEs providing information to the serving base station about cells that they detect. The present invention relates specifically to improving the current ANR proposal for E-UTRAN base stations.

DISCLOSURE OF INVENTION

An exemplary aspect of the present invention provides an E-UTRAN base station having an Automatic Neighbour Relation (ANR) function and including: a Neighbour Relation Table, NRT, comprising cell information for cells that neighbour the base station; and a measurement control module operable: i) to send a mobile communications device a request to obtain cell information for a neighbouring cell within communication range of the mobile communications device; ii) to receive a report from the mobile communications device including the requested cell information; and iii) to store information in the NRT in dependence upon the report received from the mobile communications device; wherein the base station is operable to receive data identifying if the neighbouring cell is HSPA and/or EDCH capable and is operable to include the received capability information in the NRT. The cell capability information may be provided by the mobile communications device or by an Operations & Management node (or from some node within the network).

The base station also includes a handover module for controlling handover of mobile communications devices to and from the base station and the handover module can control handover of mobile communications devices to other base stations using the reported capability information. This may be achieved by using the reported capability information to select a target cell for the handover. The handover module may select an HSPA/EDCH capable cell over a less capable cell even if signal measurements obtained by the mobile communications device for the less capable cell are better than signal measurements obtained by the mobile communications device for the HSPA/EDCH capable cell.

The base station may also include a load balancing module that performs load balancing with neighbouring cells and that uses the cell capability information to identify neighbouring HSPA capable cells and to begin load balancing measurements with them. The load balancing module may, in addition or alternatively, use the cell capability information to select the neighbouring cells with which to perform load balancing. For example, the load balancing module may segregate mobile communications devices that it is serving into HSPA capable mobile communications devices and voice only mobile communications devices and then use the cell capability information to cause handover of HSPA capable mobile communications devices to HSPA capable cells and voice only mobile communications devices to handover to HSPA non-capable cells.

The present invention also provides a mobile communications device comprising: a transceiver operable to transmit signals to and to receive signals from one or more base stations; a measurement module operable to receive a request from a serving base station, via the transceiver, to obtain cell information for a neighbouring cell and to obtain the cell information from signals broadcast by the neighbouring cell that are received by the transceiver; and a reporter module operable to send the serving base station, using the transceiver, a report that includes the obtained cell information; wherein the received request requests the mobile communications device to report whether or not the neighbouring cell is HSPA and/or EDCH capable.

The present invention also provides a method performed by an E-UTRAN base station having an Automatic Neighbour Relation (ANR) function, the method comprising: storing cell information for cells that neighbour the base station in a Neighbour Relation Table, NRT; sending a mobile communications device a request to obtain cell information for a neighbouring cell; receiving a report from the mobile communications device including the requested cell information; and storing information in the NRT in dependence upon the report received from the mobile communications device; wherein the method further comprises receiving data indicating if the neighbouring cell is HSPA and/or EDCH capable and storing corresponding capability information in the NRT.

The present invention also provides a method performed by a mobile communications device, the method comprising: receiving a request from a serving base station to obtain cell information for a neighbouring cell; obtaining the requested cell information from signals broadcast by the neighbouring cell; and sending the serving base station a report that includes the obtained cell information; wherein the received request requests the mobile communications device to report whether or not the neighbouring cell is HSPA and/or EDCH capable.

The present invention also provides software and/or firmware for programming a general purpose base station and a general purpose mobile communications device to operate in accordance with the present invention. This software may be provided on a recording medium or on a signal obtained from a computer network.

The invention also provides, for all methods disclosed, corresponding computer programs or computer program products for execution on corresponding user communications devices or base stations. The invention also provides user communications devices and base stations configured or operable to implement the methods and components thereof) and methods of updating these.

Embodiments of the invention will now be described, by way of example, with reference to the accompanying drawings, in which:

BEST MODE FOR CARRYING OUT THE INVENTION

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hardwired elements, software elements or firmware elements or any combination of these.

Overview

Figure 1:
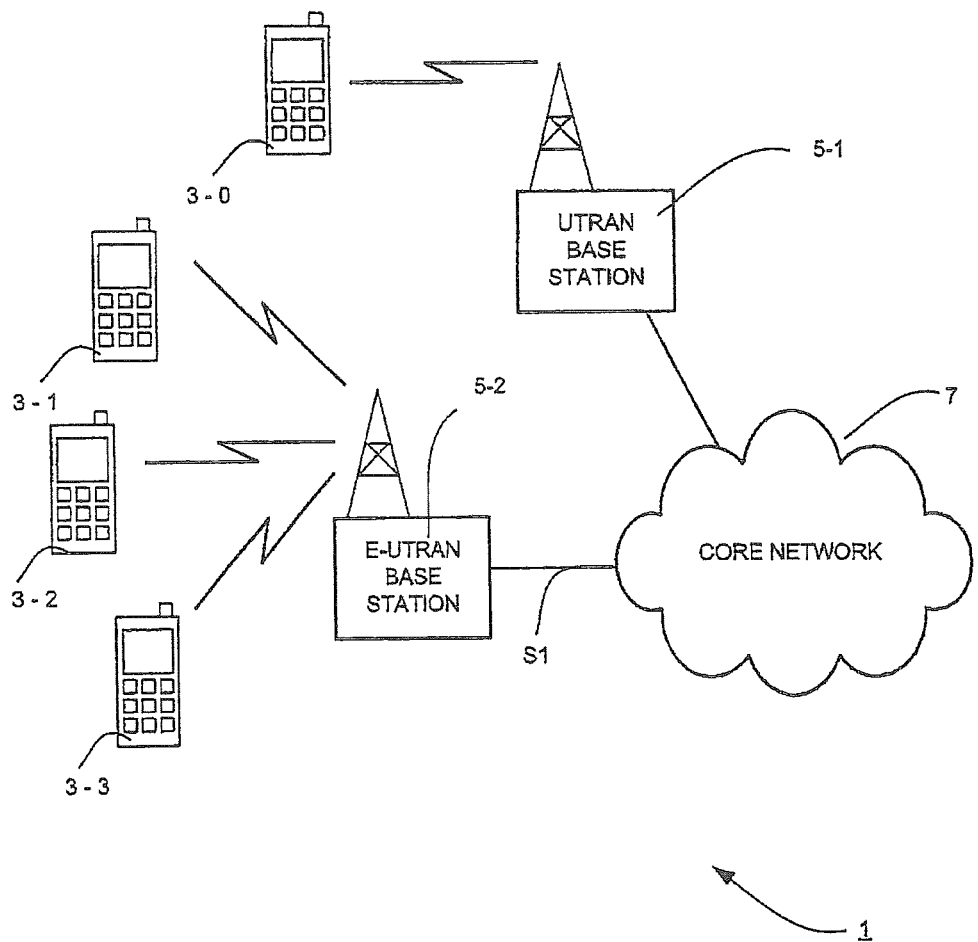
FIG. 1 illustrates schematically a cellular telecommunications system to which exemplary embodiments of the invention may be applied.

FIG. 1 schematically illustrates a mobile (cellular) telecommunication system 1 in which users of mobile telephones 3-0, 3-1, 3-2 and 3-3 can communicate with other users (not shown) via one of the base stations 5-1 or 5-2 and a telephone core network 7. In the system illustrated in FIG. 1, the base station 5-1 is a UTRAN base station and it is currently serving mobile telephone 3-0 and base station 5-2 is an E-UTRAN base station and it is currently serving mobile telephones 3-1, 3-2 and 3-3. Each base station 5 operates a number of base station cells, each having a number of uplink and downlink communications resources (sub-carriers, time slots etc) that are available for wireless communication between the mobile telephones 3 and the corresponding base station 5. In this exemplary embodiment, it will be assumed for the sake of simplicity of explanation, that each base station 5 operates a single cell. The base stations 5 allocate downlink resources to each mobile telephone 3 depending on the amount of data to be sent to the mobile telephone 3. Similarly, the base stations 5 allocate uplink resources to each mobile telephone 3 depending on the amount and type of data the mobile telephone 3 has to send to the base station 5.

The mobile telephones 3 have connected and idle modes or states. In the connected state a mobile telephone 3 is registered with a serving base station 5 and has an RRC (Radio Resource Control) connection with the base station 5 so that the network knows to which cell the mobile telephone 3 belongs. E-UTRAN base stations (such as base station 5-2) can request a connected mobile telephone 3 that it is serving to make measurements on neighbouring cells so that it can maintain an up to date list of all its neighbouring cells. To do this, the serving E-UTRAN base station 5-2 schedules appropriate measurement gaps between downlink and uplink transmissions to/from the mobile telephone 3, during which the mobile telephone 3 can make and report on the measurements requested by the E-UTRAN base station 5-2. The E-UTRAN base station 5-2 can then use this information to control handover decisions.

At present, when reporting on a UTRAN cell, the mobile telephone 3 can report the cell Global Id (CGI), the Location Area Code (LAC) and the Routeing Area Code (RAC) of the UTRAN cell. The present embodiment proposes to augment the information that the E-UTRAN base station 5-2 is able to request and in particular to include capability information for the UTRAN cell. More specifically, the embodiment proposes that the E-UTRAN base station 5-2 can request the mobile telephone 3 to report on whether the UTRAN cell is HSPA (High Speed Packet Access) and/or EDCH (Enhanced Dedicated CHannel) capable. This additional information can allow the base station to make better handover decisions and to use the information to make load balancing decisions.

Mobile Telephone

Figure 2:
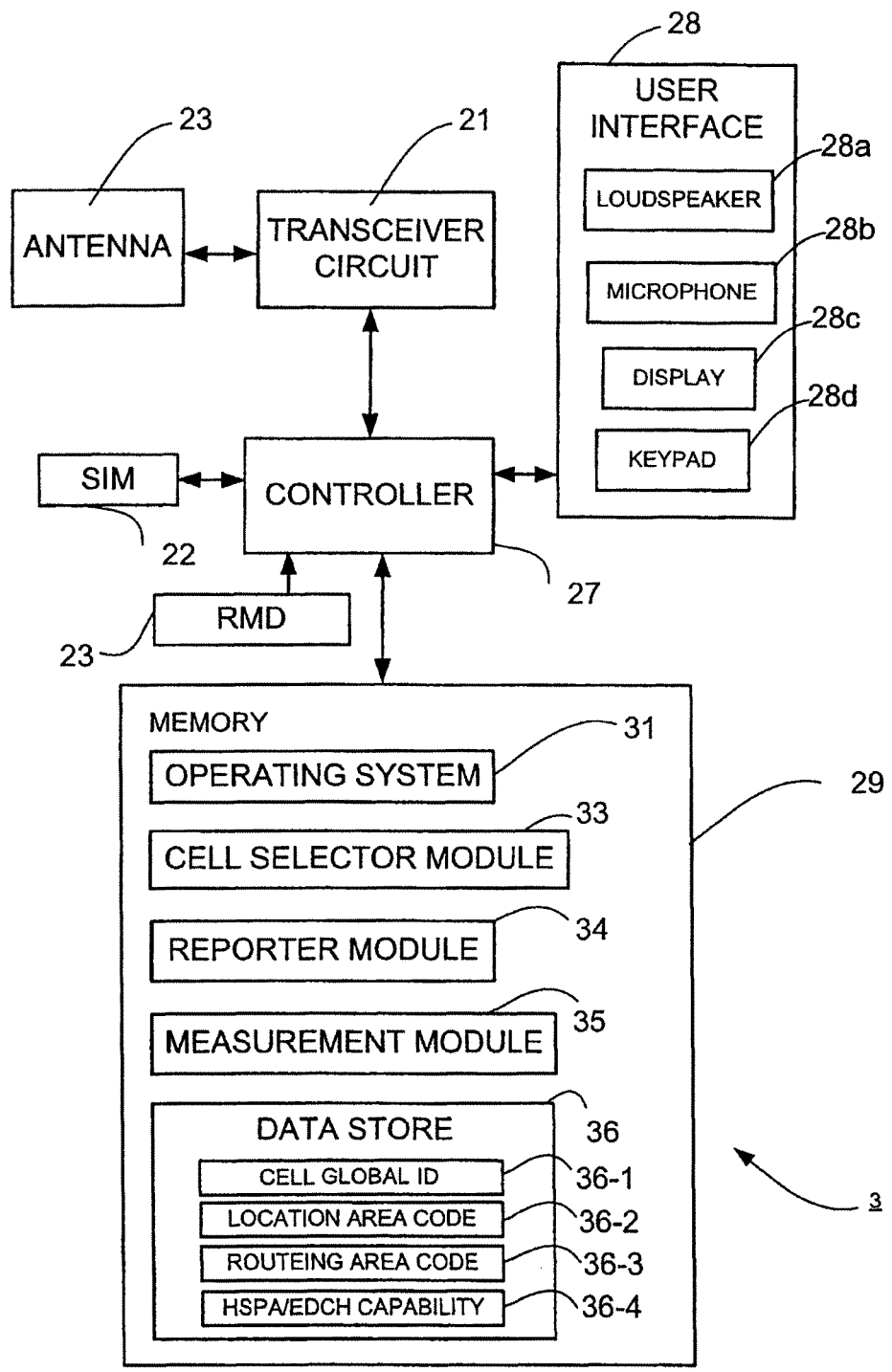
FIG. 2 is a functional block diagram to show some of the functionality of a mobile telephone forming part of the system shown in FIG. 1.

FIG. 2 is a functional block diagram of a mobile telephone 3 shown in FIG. 1. As shown, the mobile telephone 3 has a transceiver circuit 21 that is operable to transmit signals to and to receive signals from a base station 5 via one or more antenna 23. The mobile telephone 3 has a controller 27 to control the operation of the mobile telephone 3 and a SIM (Subscriber Identity Module) 22. The controller 27 is associated with a memory 29 and is coupled to the transceiver circuit 21 and to a user interface 28 having a loudspeaker 28a, a microphone 28b, a display 28c and a keypad 28d. Although not necessarily shown in FIG. 2, the mobile telephone 3 will of course have all the usual functionality of a cellular telephone and this may be provided by any one or any combination of hardware, software and firmware, as appropriate. Software may be pre-installed in the memory and/or may be downloaded via the telecommunications network or from a removable data storage device (RMD) 23, for example.

The controller 27 is configured to control overall operation of the mobile telephone 3 by, in this example, program instructions or software instructions stored within memory 29. As shown, these software instructions include, among other things, an operating system 31, a cell selector/reselector module 33, a reporter module 34 and a measurement module 35. The cell selector module 33 is operable to enable selection and reselection of cells in accordance with cell selection/reselection parameters provided by the base station 5. The measurement module 35 is operable to make measurements and obtain information on neighbouring cells that are within range of the mobile telephone 3, when instructed to do so by the serving base station 5. The reporter module 34 is operable to report the measurements and the information obtained for the neighbouring cells to the serving base station 5.

As shown in FIG. 2, the memory 29 also includes a data store 36 for temporarily storing the information obtained by the measurement module 35 until it is reported to the serving base station 5. The information to be reported includes the Cell Global ID (CGI) 36-1 of the cell, the Location Area Code 36-2 of the cell, the Routeing Area Code 36-3 of the cell and HSPA/EDCH capability information 36-4.

Base Station

Figure 3:
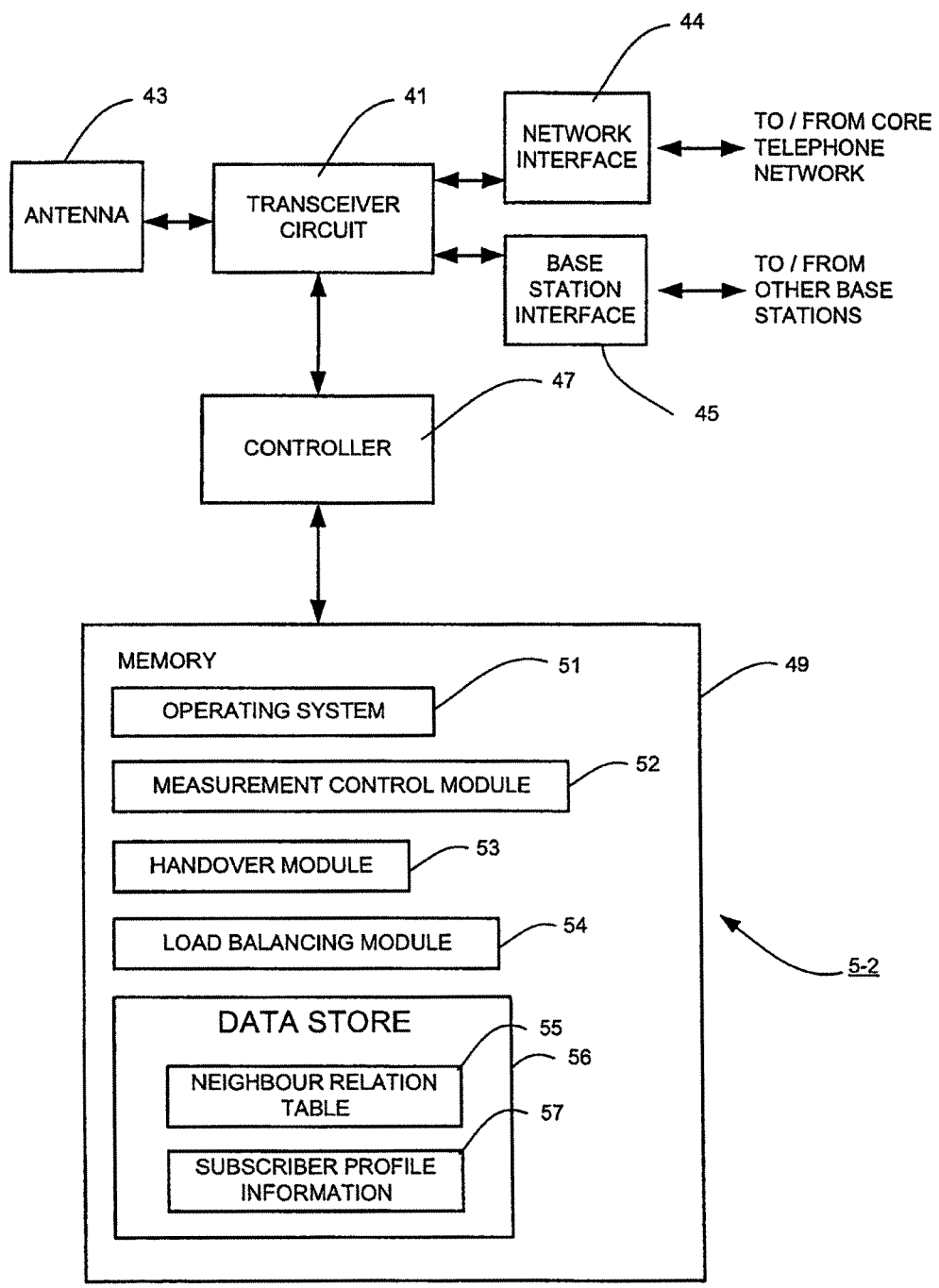
FIG. 3 is a functional block diagram to show some of the functionality of a base station forming part of the system shown in FIG. 1.

FIG. 3 shows a functional block diagram of the E-UTRAN base station 5-2 shown in FIG. 1. As shown, the E-UTRAN base station 5-2 has a transceiver circuit 41 to transmit signals to and to receive signals from the mobile telephones 3 via one or more antenna 43, a network interface 44 to transmit signals to and receive signals from the core network 7 and a base station interface 45 to transmit signals to and to receive signals from other E-UTRAN base stations (not shown). The E-UTRAN base station 5-2 has a controller 47 to control the operation of the base station. The controller 47 is associated with a memory 49. Although not necessarily shown in FIG. 3, the E-UTRAN base station 5-2 will of course have all the usual functionality of a cellular telephone network base station and this may be provided by any one or any combination of hardware, software and firmware, as appropriate. Software may be pre-installed in the memory 49 and/or may be downloaded via the telecommunications network or from a removable data storage device (RMD), for example.

The controller 47 is configured to control overall operation of the E-UTRAN base station 5 by, in this example, program instructions or software instructions stored within memory 49. As shown, these software instructions include, among other things, an operating system 51, a measurement control module 52, a handover module 53 and a load balancing module 54. The measurement control module 52 is operable to request a mobile telephone 3 to make specified measurements and obtain specified information about neighbouring cells and to receive the reports back from the mobile telephone 3. The measurement control module 52 uses the information received back from the mobile telephones 3 to maintain (and update) a Neighbour Relation Table (NRT) 55 that is stored within a data store 56 of the memory 49. The handover module 53 is operable to control the handover of a mobile telephone 3 from the current E-UTRAN cell to another cell. The handover module 53 uses cell measurement information from the mobile telephone 3, the information stored in the NRT 55 and subscriber profile information 57 (also stored in the data store 56) to select a suitable target cell for the mobile telephone 3. The load balancing module 54 is operable to provide load information for the cell to neighbouring cells, to receive load information from neighbouring cells and to make decisions on whether or not load balancing procedures should be implemented to share the load over the neighbouring cells. The load balancing module 54 uses the information stored in the NRT 55 to identify the neighbouring cells and to control the load balancing procedure.

In the above description, the base station 5 and the mobile telephones 3 are described for ease of understanding as having a number of discrete functional components or modules (such as the measurement module, cell selector module, handover module, load balancing module, reporter module etc). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

Figure 4:
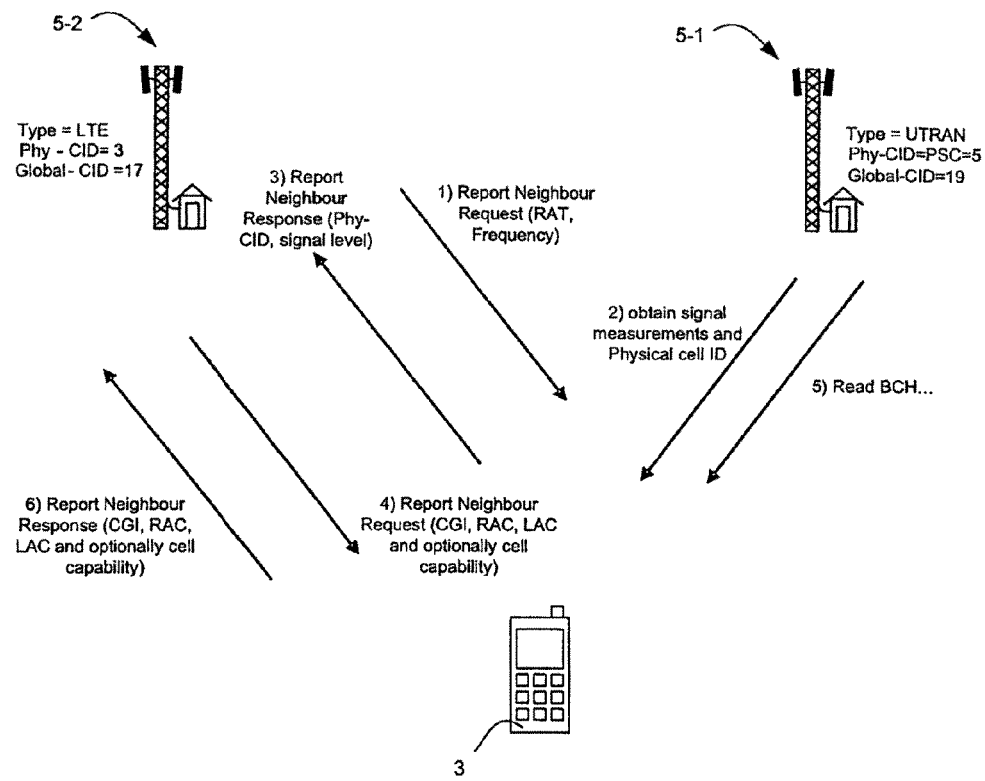
FIG. 4 illustrates the signalling that is performed using the improved ANR procedure proposed by an exemplary embodiment of the present invention.

In operation of the system described above, when a mobile telephone 3 is in a connected mode such as when making a call and is being served by the E-UTRAN base station 5-2, the base station 5-2 will ask the mobile telephone 3 to make measurements and obtain information about neighbouring cells. Gaps in the normal uplink and downlink transmissions will be scheduled by the base station 5-2 to allow the mobile telephone 3 to perform these measurements and to report the results back to the serving base station 5-2 without interfering with the current call. The sequence of events is illustrated in FIG. 4. As shown, at step 1, the serving base station 5-2 sends the mobile telephone 3 a Report Neighbour Request. The request identifies one or more RATs and frequencies on which the measurements are to be made. In the example illustrated in FIG. 4, the request includes the RAT and frequency for just UTRAN base station 5-1. In response to receiving the request, the mobile telephone 3 makes, in step 2, signal measurements on the specified frequency according to the defined RAT and obtains the physical cell ID for the detected cell. The mobile telephone 3 then sends, in step 3, a Report Neighbour Response message back to the base station 5-2 that includes the physical cell ID for the detected cell and an indication of the signal level of the signal received from the detected cell.

In response to receiving this report, the base station 5-2 may send the mobile telephone 3, in step 4, a Report Neighbour Request asking the mobile telephone 3 to obtain the CGI, LAC and RAC for the detected cell. In this embodiment, for UTRAN cells that are detected, the base station 5-2 can also optionally request the mobile telephone 3 to obtain information identifying if the UTRAN cell is capable of High Speed Packet Access (HSPA) and/or has an Extended Dedicated Channel (E-DCH). In step 5, the mobile telephone 3 obtains the requested information by reading the broadcast channel (BCH) of the detected cell, which includes the requested information as part of the broadcast system information. In step 6, the mobile telephone 3 reports the requested information back to the base station 5-2, which stores the information in the NRT 55.

Thus in this embodiment, the E-UTRAN base station 5-2 is provided with the additional information about whether or not the UTRAN cell is HSPA/EDCH capable. The E-UTRAN base station 5-2 can then use this additional information in the flowing ways:

Handover Decision Algorithm

As discussed above, the handover module 53 makes decisions about handing over the mobile telephone 3 when it is moving about and between adjacent cells. Prior to performing the handover process, the E-UTRAN base station 5-2 will request the mobile telephone 3 to obtain and report on possible target cells for the handover (based on signal measurements). With the additional capability information previously provided by the above reporting process, the handover module 54 can decide on the most appropriate target cell, when the mobile telephone 3 reports more than one cell as possible targets, based on the mobile telephone subscriber profile information 57 (typically obtained at handover) and the target cell capability. Thus if one of the target cells is a UTRAN cell that is HSPA capable and the mobile telephone subscriber has subscribed for high speed services, then the handover module 53 can select the HSPA capable cell to be the target for the handover instead of a less capable cell even though the signal measurements for the less capable cell are better than those of the chosen target cell.

Inter RAT Load Balancing SON

E-UTRAN base stations 5-2 are designed to form part of a so called Self Organising Network (SON). SONs can automatically change, configure and optimize the network coverage, cell size, frequency allocation and bandwidth, based on changes in interference, signal strength and traffic. Load balancing is one aspect of a SON that allows the network to share the load across the cells of the network. With the additional capability information available for UTRAN cells, the load balancing module 54 can change the way that it performs load balancing procedures. For example, the load balancing module 54 can use the obtained capability information to identify neighbouring HSPA capable UTRAN cells and to begin the load balancing measurements with them. Alternatively, the load balancing module 54 may perform load balancing only between E-UTRAN cells and HSPA capable UTRAN cells. The load balancing module 54 may segregate the mobile telephones 3 into high rate telephones, HSPA capable telephones and voice only telephones. In this case, the load balancing module 54 and the handover module 53 may use the additional UTRAN capability information to cause handover of the HSPA capable telephones to HSPA capable UTRAN cells and voice only telephones to handover to HSPA non-capable UTRAN cells or other RAT cells (eg GERAN cells).

Modifications and Alternatives

Detailed embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

In the above exemplary embodiments, the mobile telephones are cellular telephones. Other communications nodes or devices may include user devices such as, for example, personal digital assistants, laptop computers, web browsers, etc.

In the above exemplary embodiment, the mobile telephone obtained and reported capability information to the serving base station, specifically HSPA and/or EDCH capability information. In an alternative exemplary embodiment, the mobile telephone (UE) may report the cell ID for a new cell to the serving base station and in turn, the serving base station may report to an Operations & Management (O&M) node that a new neighbour relation has been established. In response to receiving this message (or in response to receiving a request from the base station), the O&M node may return the HSPA and/or EDCH capability information back to the serving base station for adding to the NRT table. Thus in this exemplary embodiment, it is not the mobile telephone that reports the HSPA/EDCH capability information to the base station.

In the above exemplary embodiments, a number of software modules were described. As those skilled in the art will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

Various other modifications will be apparent to those skilled in the art and will not be described in further detail here.

GLOSSARY of 3GPP Terms
UE—User Equipment—user communications device
RAT—Radio Access Technology
RAN—Radio Access Network
HO—Handover
eNodeB, eNB—E-UTRAN base station
LTE—Long Term Evolution (of UTRAN)
UTRAN—UMTS Terrestrial Radio Access Network
UMTS—Universal Mobile Telecommunications System
MME—Mobility Management Entity
BCH—Broadcast Channel
RRC—Radio Resource Control
SON—Self Organising Network
RRM—Radio Resource Management
LAC—Location Area Code
RAC—Routing Area Code
CGI—Cell Global ID
HSPA—High Speed Packet Access
E-DCH—Enhanced Dedicated Channel The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Introduction

Purpose of this contribution is to propose an enhancement of the ANR functionality so that the UE may report the IRAT capability, i.e. HSDPA/HSPA capability, whenever requested from the eNB.

The IRAT cell capability will be used by RRM, some examples of use cases are listed in paragraph.

Paragraph three will give explanations on the solution and finally paragraph four is a proposal of implementation in the spec.

Use of Cell Capability

Background

Currently, ANR functionality foresee following parameters to be reported by the UE for a potential target UTRAN neighbouring cell:
 Cell Global id
 LAC
 RAC It is believed that eNB RRM may benefit from the knowledge of the target cell capability which may be reported by the UE as part of ANR functionality.

Use Cases
 HO decision algorithm
  The eNB may decide on the most appropriate target cell when the UE reports more than one cell, based on UE subscriber profile and the target cell capability
 IRAT Load Balancing SON
  Some implementation may want to perform IRAT Load Balancing only between LTE and HSPA cells in order to guarantee service continuity. In this scenario, the eNB may use this information to decide towards which cells to start the LB measurements
 Load Based HO
  Certain implementation may benefits from the knowledge of target cell capability in order to segregate high rate UEs to HSPA capable UEs and voice UEs to other target cells Solution and Proposal Solution The HSDPA/E-DCH capability is broadcasted in System Information Block type 5 and 5bis. The periodicity is configurable; however typical value is 640 ms which fits well in the overall ANR functionality.

Figure 5:
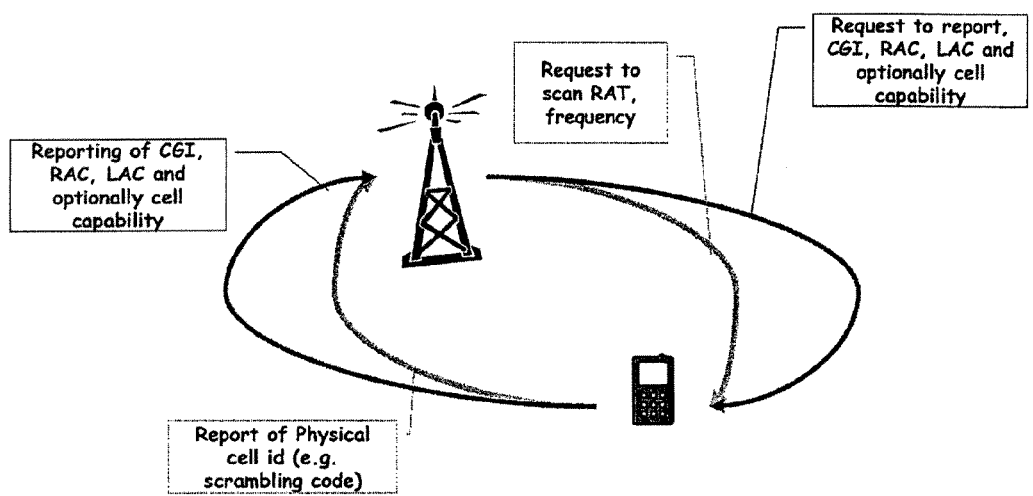
FIG. 5 illustrates reporting of parameter in UE only when requested by the eNB.

The UE will report this parameter only when requested by the eNB (FIG. 5)

Proposal

It is proposed to updates the 36.300 stage 2 specifications to capture the above solution.

Inter-RAT/Inter-frequency Automatic Neighbour Relation Function

Figure 6:
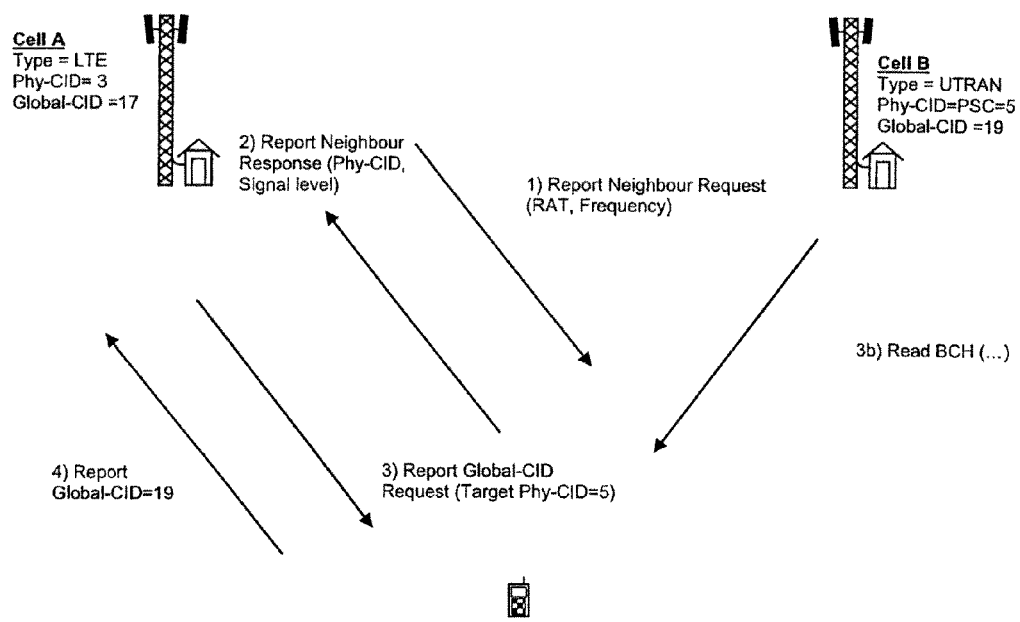
FIG. 6 illustrates an Automatic Neighbour Relation Function in case of UTRAN detected cell.

FIG. 6 illustrates Automatic Neighbor Relation Function in case of UTRAN detected cell.

For Inter-RAT and Inter-Frequency ANR, each cell contains an Inter Frequency Search list. This list contains all frequencies that shall be searched.

For Inter-RAT cells, the NoX2 attribute in the NRT is absent, as X2 is only defined for E-UTRAN.

The function works as follows:

The eNB serving cell A has an ANR function. During connected mode, the eNB can instruct a UE to perform measurements and detect cells on other RATs/frequencies. The eNB may use different policies for instructing the UE to do measurements, and when to report them to the eNB.

1 The eNB instructs a UE to look for neighbour cells in the target RATs/frequencies. To do so the eNB may need to schedule appropriate idle periods to allow the UE to scan all cells in the target RATs/frequencies.

2 The UE reports the PCI of the detected cells in the target RATs/frequencies. The PCI is defined by the carrier frequency and the Primary Scrambling Code (PSC) in case of UTRAN FDD cell, by the carrier frequency and the cell parameter ID in case of UTRAN TDD cell, by the Band Indicator+BSIC+BCCH ARFCN in case of GERAN cell and by the PN Offset in case of CDMA2000 cell.

When the eNB receives UE reports containing PCIs of cell(s) the following sequence may be used.

3 The eNB instructs the UE, using the newly discovered PCI as parameter, to read the CGI and the RAC of the detected neighbour cell in case of GERAN detected cells, CGI, LAC and, RAC in case of UTRAN detected cells and CGI in case of CDMA2000 detected cells. For the Interfrequency case, the eNB instructs the UE, using the newly discovered PCI as parameter, to read the ECGI, TAC and all available PLMN ID(s) of the interfrequency detected cell. The UE ignores transmissions from the serving cell while finding the requested information transmitted in the broadcast channel of the detected inter-system/inter-frequency neighbour cell. To do so, the eNB may need to schedule appropriate idle periods to allow the UE to read the requested information from the broadcast channel of the detected inter-RAT/inter-frequency neighbour cell.

4 After the UE has read the requested information in the new cell, it reports the detected CGI and RAC (in case of GERAN detected cells) or CGI, LAC and RAC (in case of UTRAN detected cells) or CGI (in case of CDMA2000 detected cells) to the serving cell eNB. In the inter-frequency case, the UE reports the ECGI, the, tracking area code and all PLMN-ID(s) that have been detected.

5 The eNB updates its inter-RAT/inter-frequency Neighbour Relation Table.

In the inter-frequency case and if needed, the eNB can use the PCI and ECGI for a new X2 interface setup towards this eNB. The setup of the X2 interface is described in section 22.3.2.

In case of UTRAN detected cells, the eNB may request the UE to report whether the cell is an HSPA/EDCH capable cell.

Conclusion

In this contribution we have proposed an enhancement of the ANR functionality to allow the Ue to report also the target cell capability for UTRAN cells.

Benefits and solution have been highlighted in section two and three.

It is proposed to discuss the proposal and capture the proposal in section 3 in stage 2 specification 36.300. It is further proposed to send an LS to RAN2 and ask to implement the necessary changes in the RRC specification.

This application is based upon and claims the benefit of priority from United Kingdom Patent Application No. 0914380.1, filed on Aug. 17, 2009, the disclosure of which is incorporated herein in its entirety by reference.

The invention claimed is:

1. An Evolved Universal Terrestrial Radio Access Network (E-UTRAN) base station having an Automatic Neighbour Relation (ANR) function and comprising:
   a Neighbour Relation Table (NRT) comprising cell information for cells that neighbour the E-UTRAN base station; and
   a measurement control module operable: i) to send to a mobile communications device a request to obtain cell information for a neighbouring cell within communication range of the mobile communications device wherein the sent request requests the mobile communications device to report whether the neighbouring cell is High Speed Packet Access (HSPA) and/or Enhanced Data Channel (EDCH) capable; ii) to receive a report from the mobile communications device including the requested cell information; and iii) to store information in the NRT based on the cell information included in the report received from the mobile communications device;
   wherein the base station is operable to receive, in said report from the mobile communications device, data identifying if the neighbouring cell is HSPA and/or EDCH capable, and is operable to include capability information identifying if the neighbouring cell is HSPA and/or EDCH capable, based on said received data identifying if the neighbouring cell is HSPA and/or EDCH capable, in the NRT.

2. The E-UTRAN base station according to claim 1, further comprising a handover module operable to control handover of mobile communications devices to and from the base station and wherein the handover module is operable to control handover of mobile communications devices to another base station using the capability information stored in the NRT.

3. The E-UTRAN base station according to claim 2, wherein the handover module is operable to use subscriber information and the capability information stored in the NRT to select a target cell for the handover.

4. The E-UTRAN base station according to claim 3, wherein the handover module is operable to select an HSPA/EDCH capable cell over a less capable cell even if signal measurements obtained by the mobile communications device for the less capable cell are better than signal measurements obtained by the mobile communications device for the HSPA/EDCH capable cell.

5. The E-UTRAN base station according to claim 1, further comprising a load balancing module operable to perform load balancing with neighbouring cells and wherein the load balancing module is operable to use the cell capability information to identify neighbouring HSPA capable cells and to begin load balancing measurements with the neighbouring HSPA capable cells.

6. The E-UTRAN base station according to claim 1, further comprising a load balancing module operable to perform load balancing with neighbouring cells and wherein the load balancing module is operable to use the cell capability information to select the neighbouring cells with which to perform load balancing.

7. The E-UTRAN base station according to claim 1, further comprising a load balancing module operable to perform load balancing with neighbouring cells and wherein the load balancing module is operable to segregate mobile communications devices, that the E-UTRAN base station is serving, into HSPA capable mobile communications devices and voice only mobile communications devices and is operable to use the cell capability information to cause handover of HSPA capable mobile communications devices to HSPA capable cells and voice only mobile communications devices to handover to HSPA non-capable cells.

8. The E-UTRAN base station according to claim 1, wherein the base station is operable to receive the cell capability information from the mobile communications device or from a node coupled to the base station.

9. A mobile communications device comprising:
   a transceiver operable to transmit signals to and to receive signals from one or more base stations each of which operates a respective cell;
   a measurement module operable to receive a request from a serving base station, via the transceiver, to obtain cell information for a neighbouring cell and to obtain, responsive to the request from the serving base station, the cell information from signals: that are broadcast by the base station of the neighbouring cell; and that are received by the transceiver of the mobile communications device; and
   a reporter module operable to send, to the serving base station, using the transceiver, a report that includes the obtained cell information;
   wherein the received request requests the mobile communications device to report whether the neighbouring cell is High Speed Packet Access (HSPA) and/or Enhanced Data Channel (EDCH) capable, wherein the measurement module is operable to obtain, responsive to the received request, capability information identifying if the neighbouring cell is HSPA and/or EDCH capable from the signals broadcast by the base station of the neighbouring cell and wherein the reporter module is operable to include the obtained cell capability information in the report sent back to the serving base station.

10. A method performed by an Evolved Universal Terrestrial Radio Access Network (E-UTRAN) base station having an Automatic Neighbour Relation (ANR) function, the method comprising:
    sending a mobile communications device a request to obtain cell information for a neighbouring cell wherein the sent request requests the mobile communications device to report whether the neighbouring cell is High Speed Packet Access (HSPA) and/or Enhanced Data Channel (EDCH) capable;
    receiving a report from the mobile communications device including the requested cell information; and
    storing information for cells that neighbour the base station in a Neighbour Relation Table (NRT) based on the cell information included in the report received from the mobile communications device;
    wherein the method further comprises receiving, in said report from the mobile communications device, data indicating if the neighbouring cell is HSPA and/or EDCH capable and storing capability information in the NRT for the neighbouring cell identifying if the neighbouring cell is HSPA and/or EDCH capable.

11. A method performed by a mobile communications device, the method comprising:
    receiving a request from a serving base station to obtain cell information for a neighbouring cell;
    obtaining the requested cell information from signals broadcast by the neighbouring cell; and
    sending, to the serving base station, a report that includes the obtained cell information;
    wherein the received request requests the mobile communications device to report whether the neighbouring cell is High Speed Packet Access (HSPA) and/or Enhanced Data Channel (EDCH) capable, wherein the obtaining obtains, responsive to the received request, capability information identifying if the neighbouring cell is HSPA and/or EDCH capable from the signals broadcast by the base station of the neighbouring cell and wherein the report that is sent to the serving cell includes the obtained cell capability information.

12. An Evolved Universal Terrestrial Radio Access Network (E-UTRAN) base station having an Automatic Neighbour Relation (ANR) function and comprising:
    means for storing cell information for cells that neighbour the base station in a Neighbour Relation Table (NRT);
    means for sending a mobile communications device a request to obtain cell information for a neighbouring cell wherein the sent request requests the mobile communications device to report whether the neighbouring cell is High Speed Packet Access (HSPA) and/or Enhanced Data Channel (EDCH) capable; and
    means for receiving a report from the mobile communications device including the requested cell information;
    wherein the means for storing cell information is operable to store information in the NRT based on the cell information included in the report received from the mobile communications device;
    wherein the base station further comprises means for receiving, in said report from the mobile communications device, data indicating if the neighbouring cell is HSPA and/or EDCH capable and means for storing capability information in the NRT for the neighbouring cell identifying if the neighbouring cell is HSPA and/or EDCH capable.

13. A mobile communications device comprising:
    means for receiving a request from a serving base station to obtain cell information for a neighbouring cell;
    means for obtaining the requested cell information from signals broadcast by the neighbouring cell; and
    means for sending, to the serving base station, a report that includes the obtained cell information;
    wherein the received request requests the mobile communications device to report whether the neighbouring cell is High Speed Packet Access (HSPA) and/or Enhanced Data Channel (EDCH) capable, wherein the means for obtaining is operable to obtain, responsive to the received request, capability information identifying if the neighbouring cell is HSPA and/or EDCH capable from signals broadcast by the base station of the neighbouring cell and wherein the means for sending a report is operable to send a report to the serving cell that includes the obtained cell capability information.

14. A non-transitory computer readable medium storing computer implementable instructions for causing a programmable computer device to perform the method of claim 10.

15. A non-transitory computer readable medium storing computer implementable instructions for causing a programmable computer device to perform the method of claim 11.

16. The E-UTRAN base station according to claim 2, further comprising a load balancing module operable to perform load balancing with neighbouring cells and wherein the load balancing module is operable to use the cell capability information to identify neighbouring HSPA capable cells and to begin load balancing measurements with the neighbouring HSPA capable cells.

17. The E-UTRAN base station according to claim 3, further comprising a load balancing module operable to perform load balancing with neighbouring cells and wherein the load balancing module is operable to use the cell capability information to identify neighbouring HSPA capable cells and to begin load balancing measurements with the neighbouring HSPA capable cells .

18. The E-UTRAN base station according to claim 4, further comprising a load balancing module operable to perform load balancing with neighbouring cells and wherein the load balancing module is operable to use the cell capability information to identify neighbouring HSPA capable cells and to begin load balancing measurements with the neighbouring HSPA capable cells.

19. The E-UTRAN base station according to claim 2, further comprising a load balancing module operable to perform load balancing with neighbouring cells and wherein the load balancing module is operable to use the cell capability information to select the neighbouring cells with which to perform load balancing.

20. The E-UTRAN base station according to claim 3, further comprising a load balancing module operable to perform load balancing with neighbouring cells and wherein the load balancing module is operable to use the cell capability information to select the neighbouring cells with which to perform load balancing.

* * * * *